(12) United States Patent
Weltzien et al.

(10) Patent No.: US 11,396,973 B2
(45) Date of Patent: Jul. 26, 2022

(54) SUPPORT APPARATUS

(71) Applicants: Tanya Weltzien, St. Petersburg, FL (US); Johnny Peterson, St. Petersburg, FL (US)

(72) Inventors: Tanya Weltzien, St. Petersburg, FL (US); Johnny Peterson, St. Petersburg, FL (US)

( * ) Notice: Subject to any disclaimer, the term of this patent is extended or adjusted under 35 U.S.C. 154(b) by 21 days.

(21) Appl. No.: 17/029,543

(22) Filed: Sep. 23, 2020

(65) Prior Publication Data
US 2021/0123562 A1   Apr. 29, 2021

Related U.S. Application Data

(60) Provisional application No. 62/926,984, filed on Oct. 28, 2019.

(51) Int. Cl.
| | |
|---|---|
| *F16M 11/14* | (2006.01) |
| *F16M 11/20* | (2006.01) |
| *F16M 11/10* | (2006.01) |
| *F16M 11/38* | (2006.01) |
| *F16M 11/28* | (2006.01) |

(52) U.S. Cl.
CPC ......... *F16M 11/2078* (2013.01); *F16M 11/10* (2013.01); *F16M 11/28* (2013.01); *F16M 11/38* (2013.01); *F16M 11/14* (2013.01); *F16M 2200/022* (2013.01); *F16M 2200/027* (2013.01)

(58) Field of Classification Search
USPC .... 248/150, 151, 161, 404, 405, 406.1, 415, 248/418, 165, 166, 168, 170, 186.1, 248/186.2, 187.1, 176.3
See application file for complete search history.

(56) References Cited

U.S. PATENT DOCUMENTS

| | | | |
|---|---|---|---|
| 8,747,418 B2 * | 6/2014 | Qureshi | F16M 11/14 248/161 |
| 2005/0265711 A1 * | 12/2005 | Heibel | F16M 11/42 396/419 |
| 2018/0321573 A1 * | 11/2018 | Prichard | F16M 11/2085 |
| 2021/0140579 A1 * | 5/2021 | Arrizon | F16M 11/2078 |

* cited by examiner

*Primary Examiner* — Alfred J Wujciak
(74) *Attorney, Agent, or Firm* — DP IP Group; Franco S. De Liguori (57) ABSTRACT

In one aspect, the present invention relates to a support apparatus including a base member, a ball joint member movably mounted to base member, an adjustable stand interconnected with ball joint member, and a receiving member removably mounted to the adjustable stand for securely receiving an object or device. In another aspect, the present invention relates to the combination of the support structure and a device comprised of anyone of an appliance, a tool, a portable electronic device, and an adult sexual stimulation device removably securely mounted to the support structure at various preselected positions relative to the base member.

16 Claims, 11 Drawing Sheets

SUPPORT APPARATUS

RELATED APPLICATION

This application claims the benefit of U.S. Provisional Patent Application No. 62/926,984, filed on Oct. 28, 2019.

BACKGROUND

Field

The present invention relates generally to a support apparatus and, in particular, to a support apparatus for removably holding and retaining an object or device for permitting hands free self-manipulation by one or more users.

BACKGROUND INFORMATION

It is common for objects and devices, in particular interactive equipment, to be supported for use in a hands-free manner. Such hands-free support enables the person interacting with the device to have more freedom of movement and the ability to interact in a variety of ways without the restriction of at least one of their hands holding the device. Such devices include, among other things and without limitation, appliances, electronic devices, tools, and adult sexual stimulation aids (sex toys). With appliances, electronic devices, and tools, the ability to use these types of devices in a hands-free manner can increase efficiency and/or productivity. With sex toys in particular, the ability to use the sex toy in a hands-free manner can increase the enjoyment and sexual satisfaction derived from the sex toy.

In today's society, instant gratification is a much sought-after goal. People are continually striving to devise more creative activities for deriving pleasure. The sexual device industry is fast becoming a significant market force, and the styles and varieties of sexual aids is limited only by the imagination. Sex toys such as vibrators and other massagers are a mainstay of many male and female private collections. Needless to say, for effective operation, the user must grasp the device with her hand and manually manipulate it as required. On occasion, however, it may be inconvenient or impractical to use one's hand, especially if the user has his/her hands engaged with a partner or is engaged in some other activity. While it may be possible to affix the vibrator or massager to a surface, the result may be dissatisfying if the rigid placement of the device does not allow for reciprocal movement with the user, and may even cause pain.

Furthermore, vibrators occasionally have power cords which can be a hindrance when mounting the device. Structures with receptacles for receiving the shaft of a vibrator normally work quite well for those that are battery operated and are cordless. For those vibrating devices which have a cord emanating from their base shaft end, however, a receptacle mounting means poses a problem. The extra space occupied by the cord prevents a snug fit, which is necessary for retention of the vibrator. While an open-bottomed receptacle might permit the cord to be guided through, it presents an inconvenience to the user in having to thread the cord through the open bottom end. A person seeking instant gratification is not likely to have the patience required to surgically guide the cord through that opening.

Moreover, sex toys may be used by one person for providing pleasure to another person. Existing support arrangements for sex toys in this case typically include strap arrangements which enable one person to attach the toy to their body and use it for providing pleasure to their partner. Alternatively, a sex toy may be used by a person, when alone, for providing their own pleasure. If the person is alone, they may use the straps to secure the toy at a particular location on their own body, however this means that the toy is located in a stationary position. Alternatively, they could use the straps to attach the toy to a suitable surface or object so that they can obtain hands free pleasure from the toy. However, such strap arrangements usually retain the toy in a rigid position, which may make movement relative to the toy may be difficult or uncomfortable. In addition, for toys which are operable by controls mounted up the toy itself, existing support arrangements retain the toy in a manner which makes it difficult or awkward to access operating controls whilst the toy is retained in the support.

In view of the foregoing, there is a need for an improved support apparatus for removably holding and retaining an object or device for permitting hands free self-manipulation by a user which overcomes the drawbacks of the conventional art, including the above-mentioned inconveniences and/or limitations.

SUMMARY

It is an object of the present disclosure to provide a capability for mounting an object or device (hereinafter "device"), such as an appliance, tool or sexual stimulation aid (e.g., sex toy), so that it provides relative movement with respect to the point of mounting so the user may enjoy hands free manipulation.

Another object of the present invention is to provide a hands free support apparatus for use with a device that can be used by one or more person and which supports the device in a way which facilitates varied and comfortable interaction with the device and in particular which facilitates access to operating controls located on the device. When the device is a sex toy, an object of the present invention is a hands-free support apparatus which may be of particular use for persons suffering mobility problems who are unable to support themselves in the missionary position or unable to kneel or stand comfortably for a long enough period to pleasure their partner.

A further object of the present invention is to provide a support apparatus configured to removably mount the device to a variety of surfaces via a quick and easy attachment.

Still a further object of the present invention is to provide a support apparatus for mounting the device via a quick and easy attachment in a variety of orientations.

Yet a further object of the present invention is to provide a support apparatus for mounting a device in a manner such as to accommodate a power cord emanating from the device and still retain the device in a snug, secure mounted relationship.

According to a first aspect of the present invention, there is provided a support apparatus comprising: a base member; a ball joint member movably mounted to the base member; an adjustable stand interconnected with the ball joint member; and a receiving member removably mounted to the stand for securely receiving an object or device.

In an exemplary embodiment, the support apparatus further comprises support leg portions extending from the base member for supporting the base member on a surface. Preferably, each support leg portion is mounted to the base via a hinge mechanism to facilitate storage of the base when the support apparatus is not in use.

Preferably, the terminal end of each leg is provided with means for removably and securely mounting the base to a variety of surface during use of the support apparatus. In an exemplary embodiment, the means for securely mounting comprises suction cups.

A generally central portion of the base is preferably formed with a cup-like recess configured to receive and securely retain the ball joint member. In this configuration, the ball joint member is able to undergo rotational movement at various angles relative to the base. A locking device is preferably provided and accessible by a user from an exterior of the base for locking the ball joint member in anyone of several angular orientations relative to the base during use of the support apparatus.

In an exemplary embodiment, the adjustable stand comprises rod-like tubular members or conduits including a first tubular member supporting the receiving member and a second tubular member into which the first tubular member is inserted. The first and second tubular members form a telescoping stand permitting the extent to which the first tubular member extends into and out of the second tubular member to be varied so as to permit quick and easy adjustment of the length of the stand during use of the support apparatus. A locking device is preferably mounted to the stand to securely, removably secure the first tubular member relative to the second tubular member at a desired, preselected length.

Preferably, the receiving member is adjustably mounted to a free, terminal end of the first tubular member so as to permit the position of the receiving member to be adjusted at various angular orientations relative to the first tubular member and, therefore, the stand, during use of the support apparatus. A locking device is preferably mounted to the receiving member for securely, removably securing the receiving member to the first tubular member in anyone of several angular orientations relative to the first tubular member, and thus the base, during use of the support apparatus.

According to the present invention, the means for attachment between the various components of the support apparatus, including locking devices, enable a device to be removably secured to the receiving member in various positional (e.g., angular, rotational, linear) orientations relative to the base during use of the support apparatus. The various locking devices are preferably configured for manual adjustment to facilitate assembly of the support apparatus and use of the device to be mounted thereto.

In another aspect, the present invention is directed to a support apparatus, as described above according to the first aspect, in combination with a device configured to be removably, securely mounted to the receiving member for allowing the device to be positioned at different angles for use (i.e., for holding the device in a desired using position).

In one embodiment of the apparatus/device combination, the device comprises an appliance, such as a hand-held hair dryer or similar device. In another embodiment, the device comprises a tool, such as a hand-held drill, reciprocating hammer or saw, and the like. In yet another embodiment, the device comprises a portable electronic device (e.g., mobile phone, personal digital assistant, smartphone, DVD, VCD, LCD, or the like). In yet another embodiment, the device comprises an adult sexual stimulation aid (e.g., sex toy), such as a vibrator or reciprocal movement-type sex toy.

The above and other objects, features and advantages of the present invention will become apparent from the following detailed description taken with the accompanying drawings showing preferred embodiments of the invention.

BRIEF DESCRIPTION OF THE DRAWINGS

The foregoing summary, as well as the following detailed description of preferred embodiments of the disclosure, will be better understood when read in conjunction with the accompanying drawings. For the purpose of illustrating the disclosure, there is shown in the drawings embodiments which are presently preferred. It should be understood, however, that the disclosure is not limited to the precise arrangement and instrumentalities shown.

DETAILED DESCRIPTION

The present disclosure now will be described more fully hereinafter with reference to the accompanying drawings, in which exemplary embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art.

For convenience of description, the terms "front", "back", "upper", "lower", "top", "bottom", "front", "rear", "right", "left", "side" and words of similar import will have reference to the various members and components of the support apparatus and combined support apparatus/device of the present disclosure as arranged and illustrated in the figures of the drawings and described hereinafter in detail.

It should also be understood that the terms "about," "approximately, generally," "substantially" and like terms, which may be used herein when referring to a dimension or characteristic of a component of the present disclosure, indicate that the described dimension/characteristic is not a strict boundary or parameter and does not exclude minor variations therefrom that are functionally the same or similar, as would be understood by one having ordinary skill in the art. At a minimum, such references that include a numerical parameter would include variations that, using mathematical and industrial principles accepted in the art (e.g., rounding, measurement or other systematic errors, manufacturing tolerances, etc.), would not vary the least significant digit.

Any use of ordinal terms such as "first," "second," "third," etc., to refer to an element does not by itself connote any priority, precedence, or order of one element over another, or the temporal order in which acts of a method are performed. Rather, unless specifically stated otherwise, such ordinal terms are used merely as labels to distinguish one element having a certain name from another element having a same name (but for use of the ordinal term).

FIGS. 1-18 illustrate one exemplary embodiment of the support apparatus as one aspect of the present invention.

Figure 1:
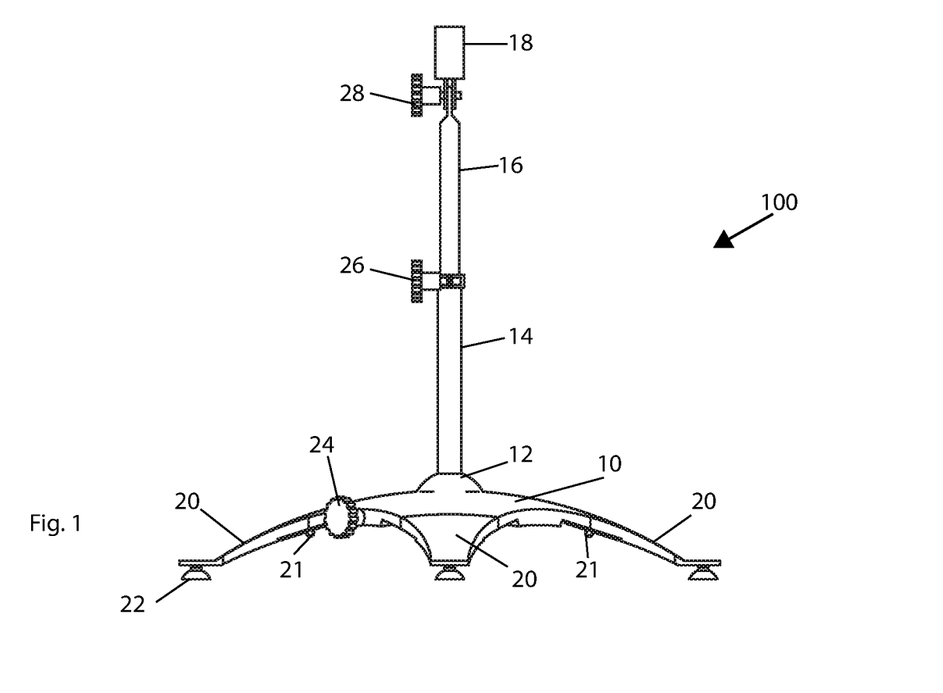
FIG. 1 is a side elevational view of the support apparatus according to an exemplary embodiment of the present invention.
Figure 2:
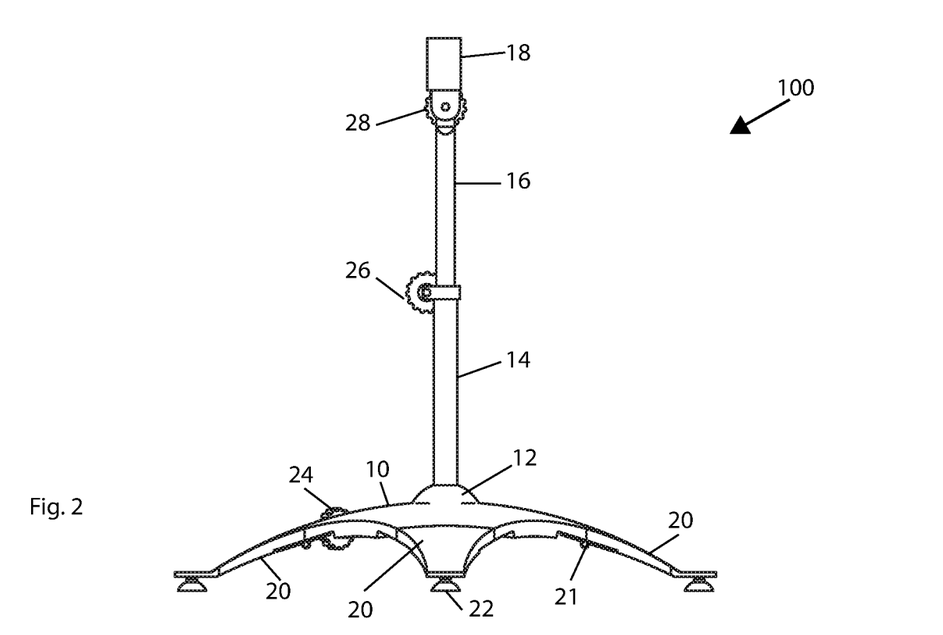
FIG. 2 is a side elevational view of the support apparatus shown in FIG. 1, turned 90 degrees from the view in FIG. 1.
Figure 3:
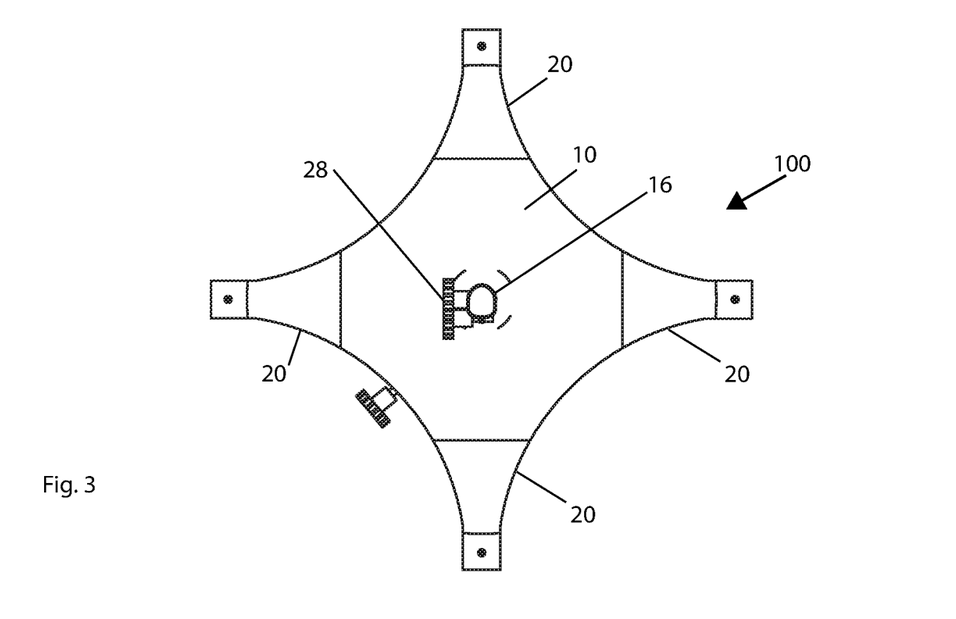
FIG. 3 is a top view of the support apparatus shown in FIG. 1.
Figure 4:
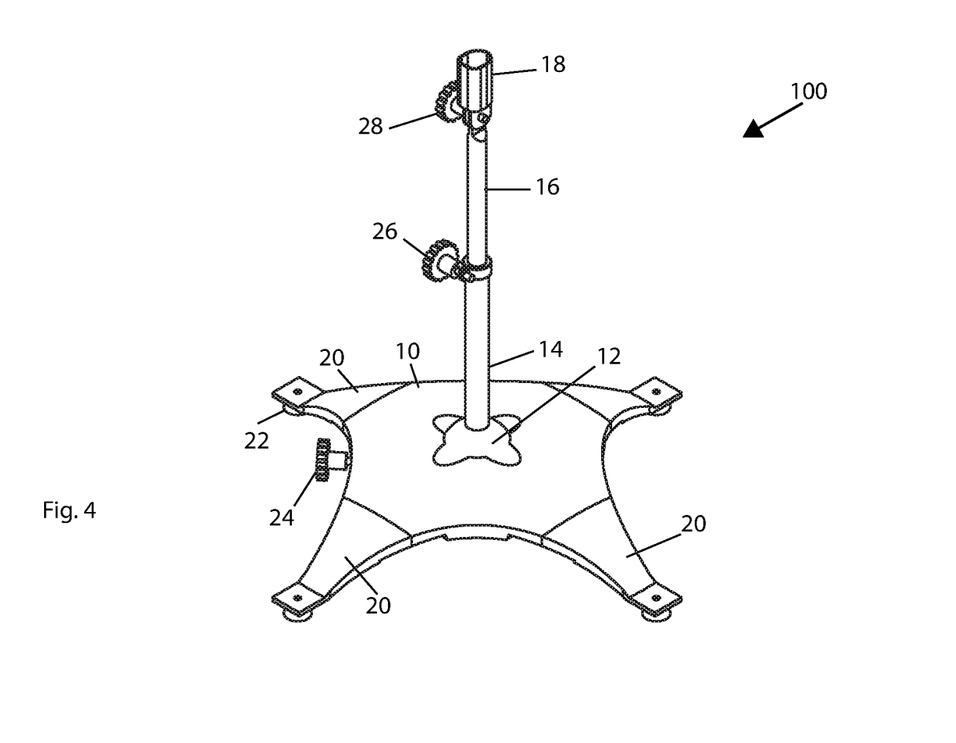
FIG. 4 is a top perspective view of the of the support apparatus shown in FIG. 1.

FIG. 1 is a side elevational view of the support apparatus, generally designated at 100, according to an exemplary embodiment of the present invention. Support apparatus 100 comprises a base member 10, a ball joint member 12 movably mounted to base member 10, an adjustable stand 14, 16 interconnected with ball joint member 12, and a receiving member 18 removably mounted to adjustable stand 14, 16 for securely receiving an object or device (not shown in FIG. 1) as described herein. FIG. 2 is a side elevational view of support apparatus 100 shown in FIG. 1, except that it is turned 90 degrees to the left relative to FIG. 1. FIG. 3 is a top view of support apparatus 100 shown in FIG. 1. FIG. 4 is a top perspective view of support apparatus 100 shown in FIG. 1.

Figure 15:
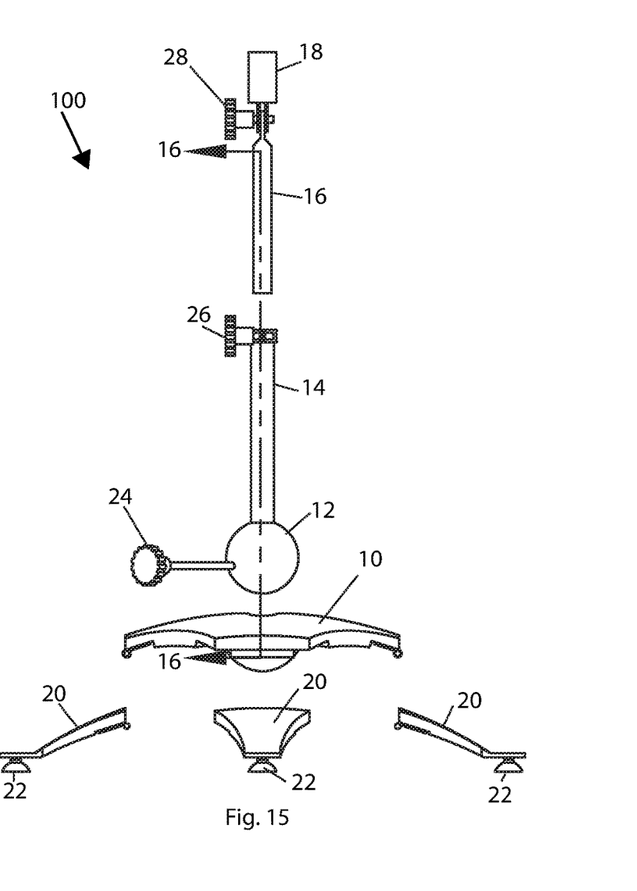
FIG. 15 is an exploded view of the support apparatus shown in FIG. 1.
Figure 16:
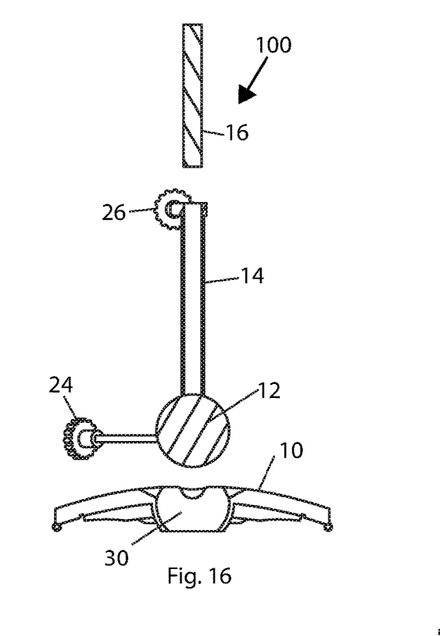
FIG. 16 is an exploded cross-sectional view of the support apparatus taken along line 16-16 of FIG. 15.
Figure 17:
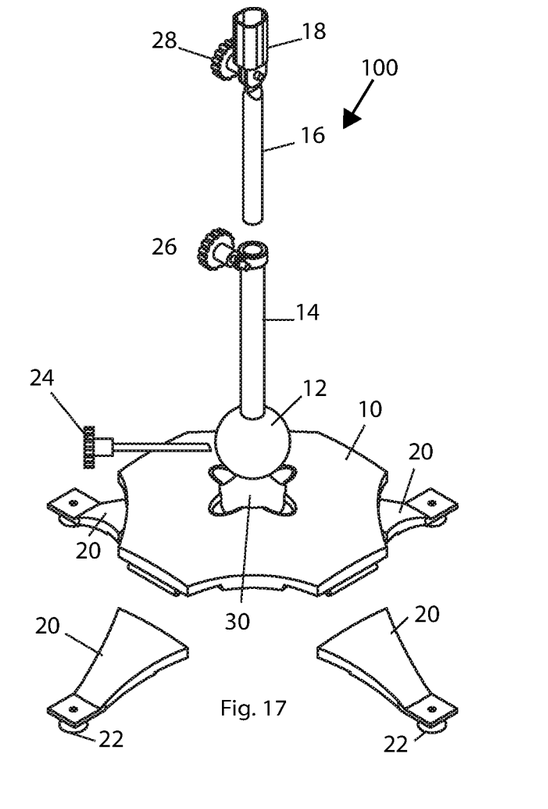
FIG. 17 is an exploded top perspective view of the support apparatus shown in FIG. 15.

FIGS. 15-17 show various exploded views of support apparatus 100 illustrating the various components of support apparatus 100, including corresponding structural and positional relationships among the components as described herein. Specifically, FIG. 15 is an exploded view of the support apparatus shown in FIG. 1, FIG. 16 is an exploded cross-sectional view of the support apparatus taken along line 16-16 of FIG. 15, and FIG. 17 is an exploded top perspective view of the support apparatus shown in FIG. 15.

Referring to the figures, a locking device (first locking device) 24 is provided and accessible by a user from an exterior of base 10 for locking ball joint member 12 in anyone of several preselected angular positions relative to base 10 during use of support apparatus 100, such as those shown in FIGS. 9-14. In this embodiment, locking device 24 includes a knob portion configured to be manipulated by the user and a pin or stem portion extending from the knob portion for contacting ball joint member 12 to securely retain it in the preselected angular position relative to base 10.

Figure 5:
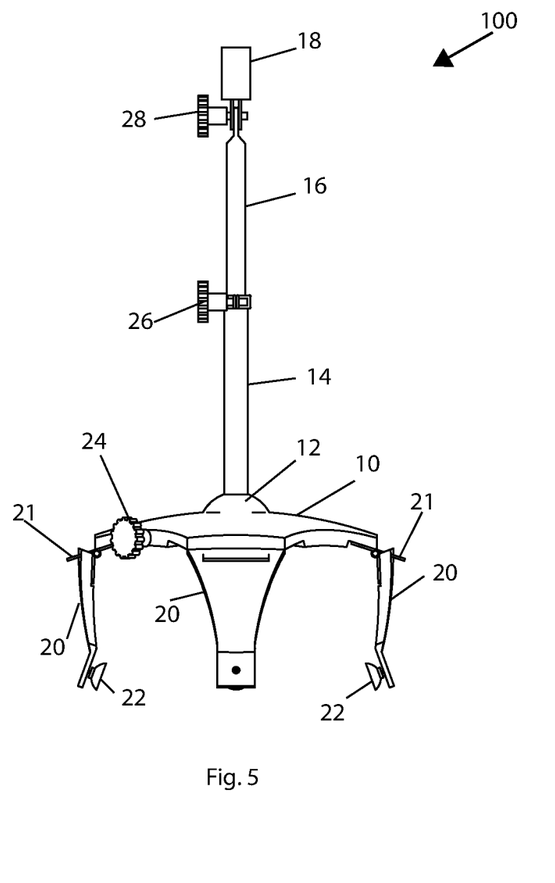
FIG. 5 is a view of the support apparatus similar to FIG. 1 showing the support leg portions of the base in a partially folded state.
Figure 6:
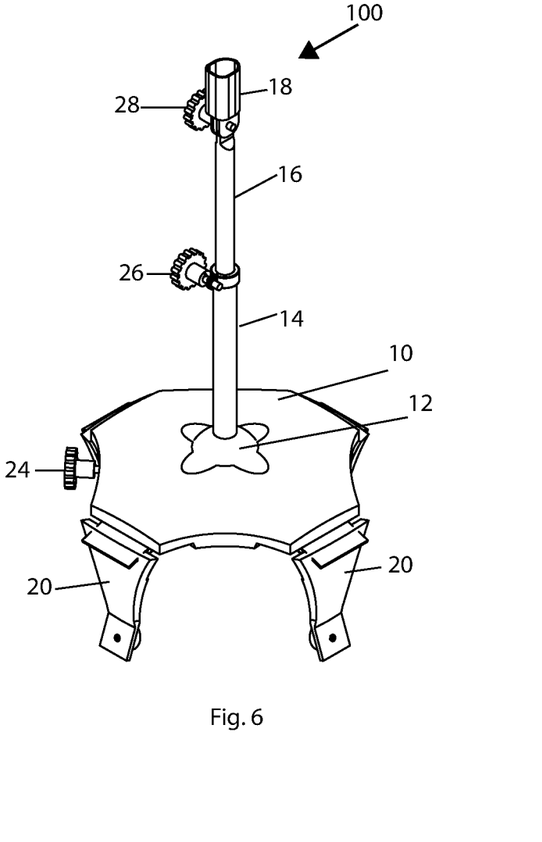
FIG. 6 is a view of the support apparatus similar to FIG. 4 showing the support leg portions of the base in a partially folded state.
Figure 7:
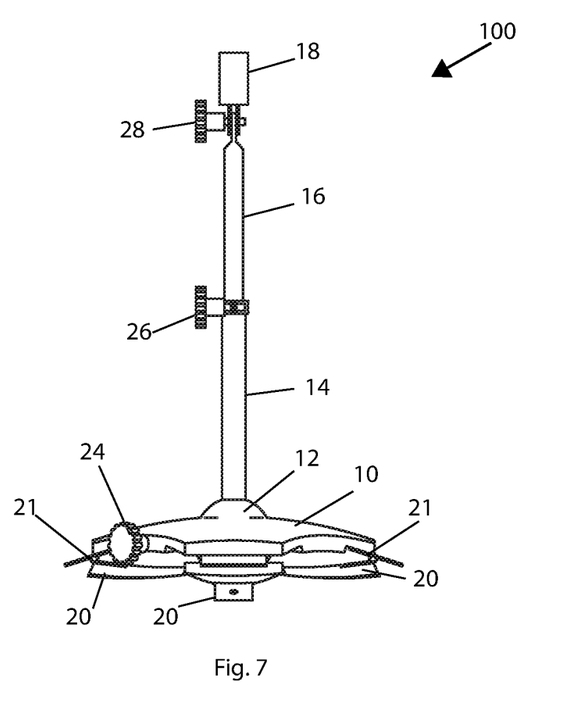
FIG. 7 is a view of the support apparatus similar to FIG. 1 showing the support leg portions of the base in a complete folded state.
Figure 8:
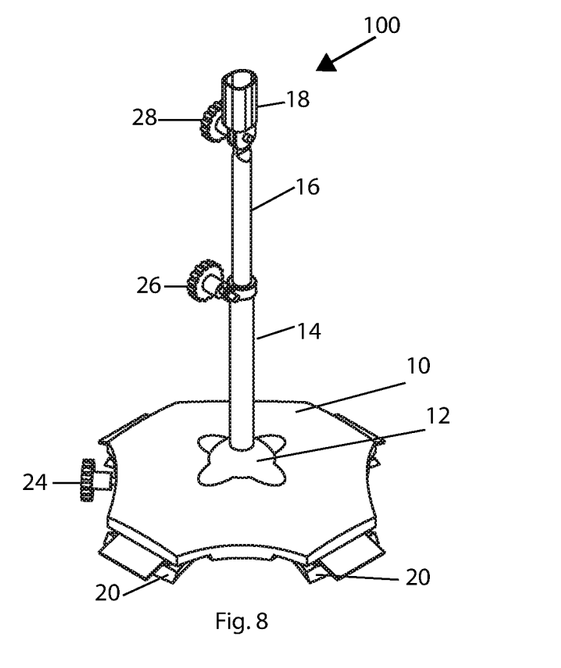
FIG. 8 is a view of the support apparatus similar to FIG. 4 showing the support leg portions of the base in a complete folded state.
Figure 18:
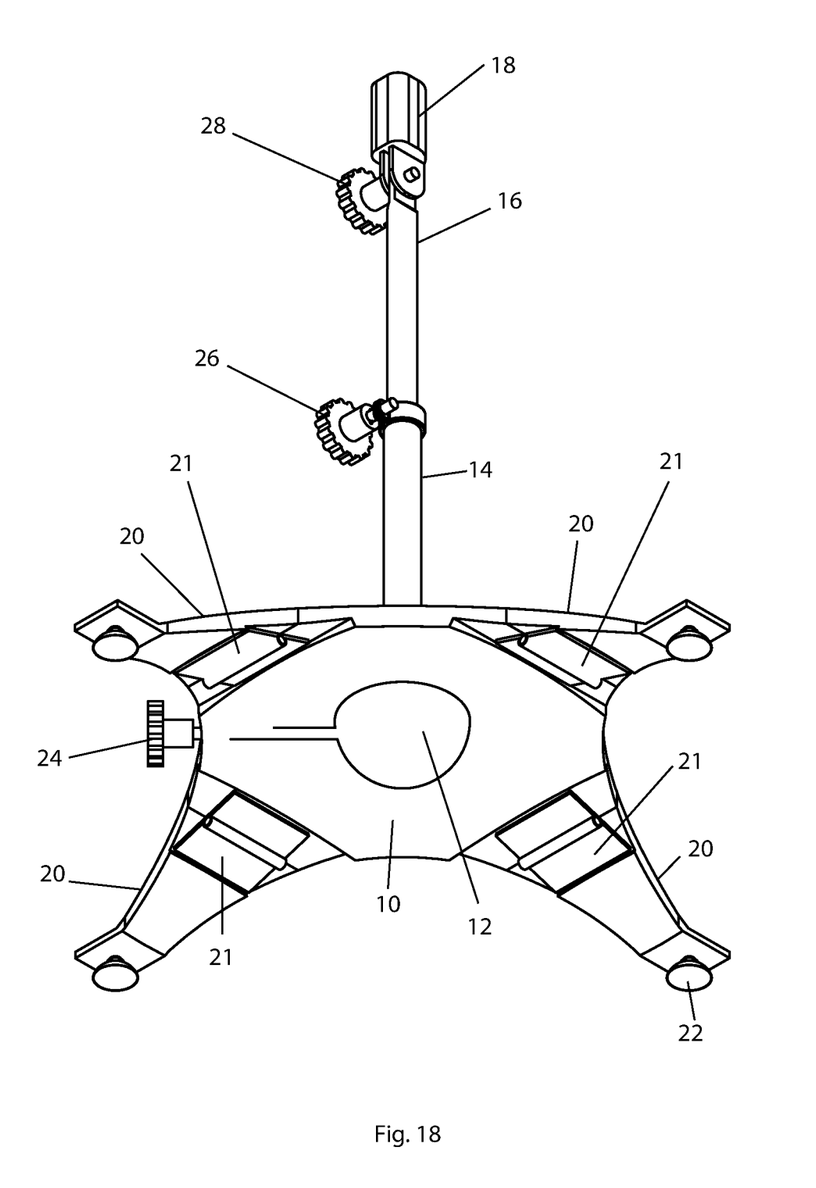
FIG. 18 is a bottom view in perspective of the base for the support apparatus according to the present invention.

In an exemplary embodiment, base member 10 is provided with support leg portions 20 (four in this embodiment) extending from base member 10 for supporting the base member 10 on a surface. Preferably, each support leg portion 20 is mounted on base member 10 via a hinge 21 to facilitate storage of base member 10 when support apparatus 100 is not in use. Hinge 21 allows each support leg portion 20 to be pivoted relative to base 10 to place support leg, portion 20 in a folded state relative to base 10. FIG. 5 is a view of support apparatus 100 similar to FIG. 1 and further showing support leg portions 20 in a partially folded state. FIG. 6 is a view of support apparatus 100 similar to FIG. 4 and further showing support leg portions 20 in a partially folded state. FIG. 7 is a view of support apparatus 100 similar to FIG. 1 and additionally showing support leg portions 20 in a complete folded state. FIG. 8 is a view of support apparatus 100 similar to FIG. 4 showing support leg portions 20 in a complete folded state. In the folded state shown in FIGS. 7 and 8, leg portions 20 are completely folded over a rear surface of base 10 so as to reduce the overall profile of base 10 to make it suitable for storage during non-use of support apparatus 100. FIG. 18 is a bottom view in perspective of base 10 illustrating the rear surface of base 10 on which leg portions 20 are folded in the folded state described above.

In this exemplary embodiment (see FIGS. 1, 5, 7 and 18), hinge 21 is in the form of a butt hinge interconnecting each support leg portion 20 with base member 10. However, it is understood that hinges 21 are not limited to butt hinges, and that other types of hinges, such as spring hinges, are suitable for permitting leg portions 20 to pivot relative to base 10 to allow placement of leg portions 20 between the folded and unfolded states as described above.

Preferably, the terminal end of each leg portion 20 is provided with means for removably and securely mounting base 10 to a variety of surfaces during use of support apparatus 100. In an exemplary embodiment, the means for securely mounting comprises suction cups 22. Examples of the types of surfaces on which support apparatus 100 can be securely mounted via suction cups 22 include ceramic, plastic and wood surfaces.

In the exemplary embodiment, the adjustable stand comprises rod-like tubular members or conduits including a first tubular member 16 supporting receiving member 18 and a second tubular member 14 into which first tubular member 16 is inserted. First and second tubular members 16, 14 form a telescoping stand permitting the extent to which first tubular member 16 extends into and out of second tubular member 14 to be varied so as to permit quick and easy adjustment of the length of the stand during use of support apparatus 100. A locking device 26 (second locking device) is mounted to the stand to securely, removably secure first tubular member 16 relative to second tubular member 14 to achieve a desired, preselected length for the adjustable stand.

Figure 9:
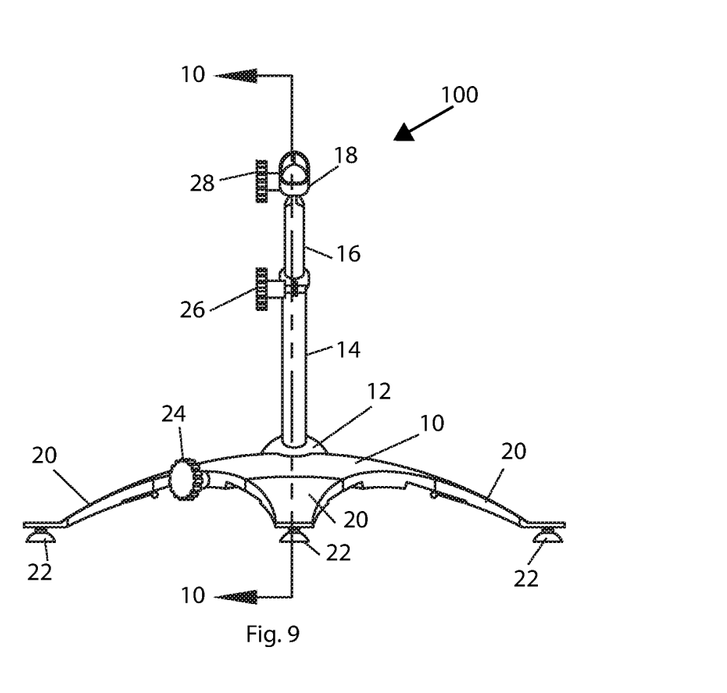
FIG. 9 is a view of the support apparatus similar to FIG. 1 showing the adjustable stand in one exemplary positioned at an inclination angle relative to the base as compared to FIG. 1, i.e., inclined to the left of the figure in FIG. 1.
Figure 10:
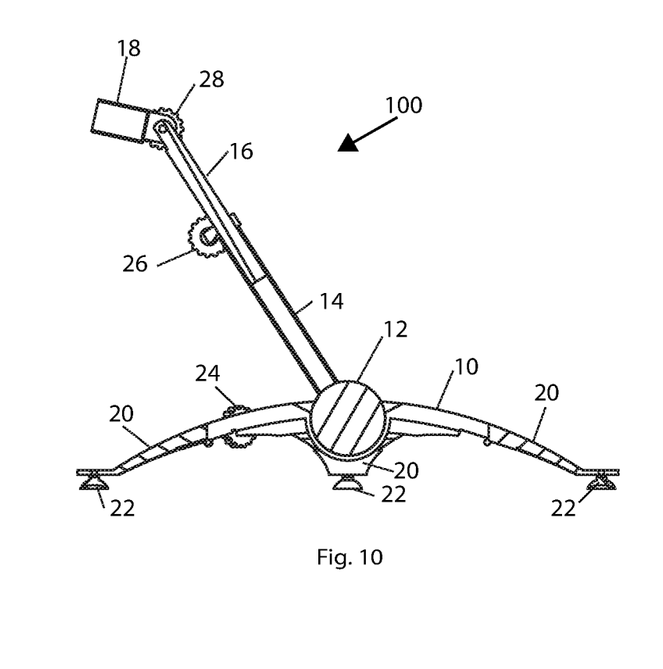
FIG. 10 is a cross-sectional view of the support apparatus taken along line 10-10 in FIG. 9.
Figure 12:
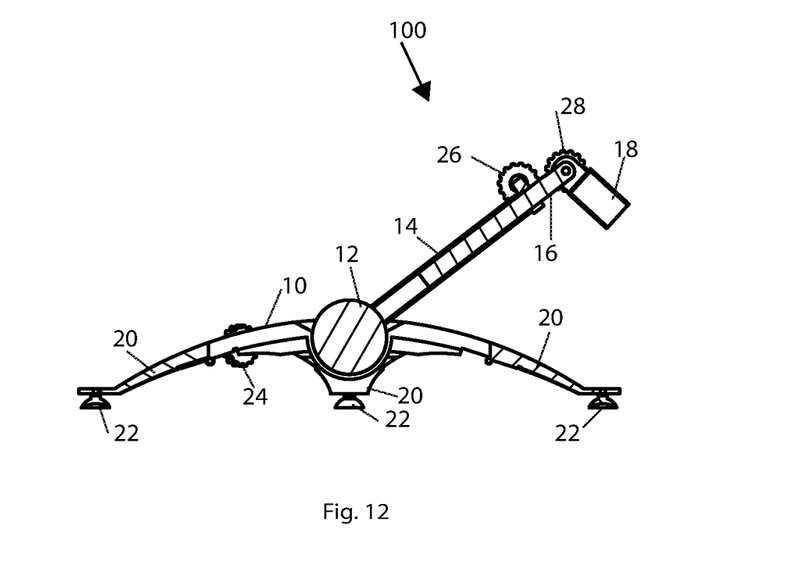
FIG. 12 is a cross-sectional view of the support apparatus taken along line 12-12 in FIG. 11.
Figure 13:
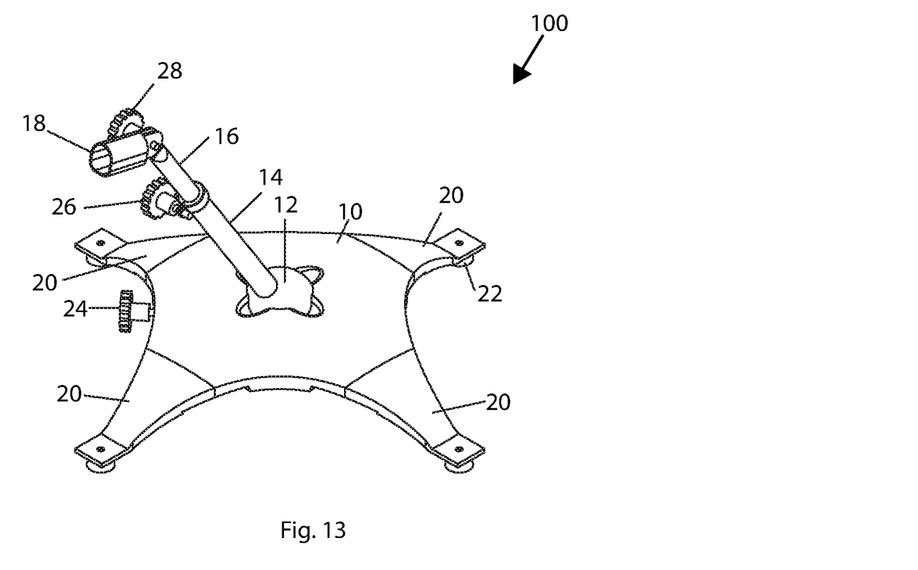
FIG. 13 is a top perspective view of the support apparatus shown in FIG. 10.

Referring to FIGS. 16 and 17, a cup-like recess 30 is formed in a generally central portion abase 20 for receiving and securely retaining ball joint member 12. Ball joint member 12 is configured to undergo rotational movement to place adjustable stand 14, 16 at various angles relative to base 10, as shown in FIGS. 9-14. Specifically, FIG. 9 is a view of support apparatus 100 similar to FIG. 1, except that in FIG. 9 the adjustable stand, formed of first and second tubular members 16, 14, is inclined or slanted forwardly in the figure relative to base 10 as compared to the configuration in FIG. 1. This inclined configuration is also shown in FIG. 10 which illustrates a cross-sectional view of support apparatus 100 taken along line 10-10 in FIG. 9. FIG. 13 is a top perspective view of the support apparatus shown in FIG. 10.

Figure 11:
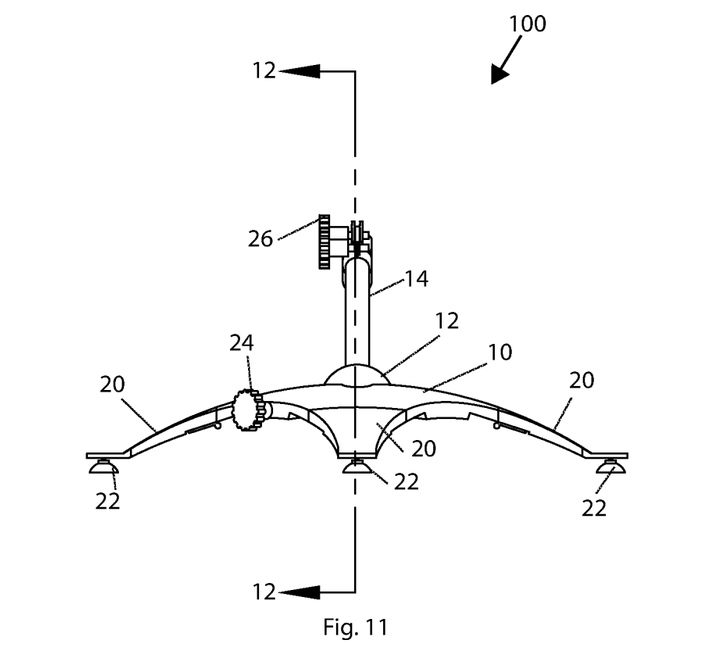
FIG. 11 is a view of the support apparatus similar to FIG. 1 showing the adjustable stand positioned in another exemplary position at an inclination angle relative to the base as compared to FIG. 1, i.e., inclined to the right of the figure in FIG. 1.
Figure 14:
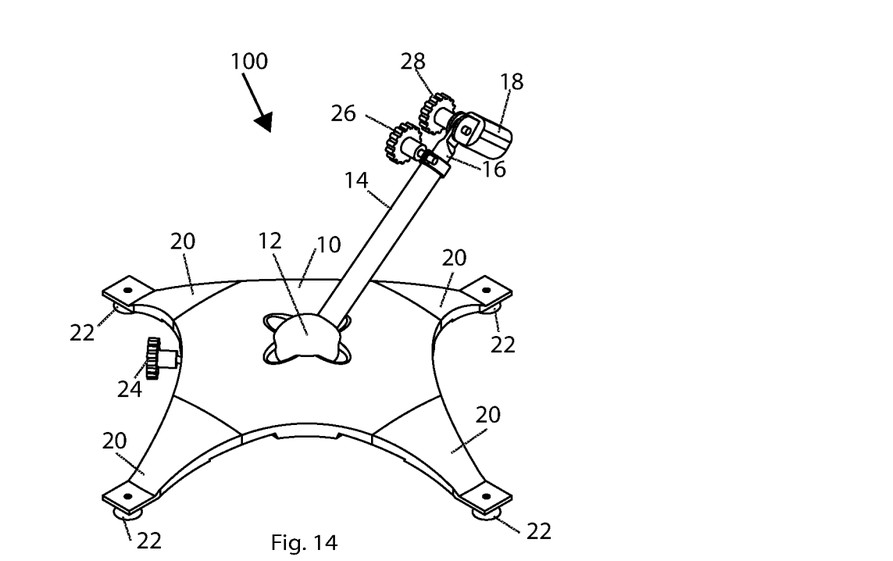
FIG. 14 is a top perspective view of the support apparatus shown in FIG. 12.

FIG. 11 is a view of the support apparatus similar to FIG. 1, except that in FIG. 11 the adjustable stand is inclined rearwardly in the figure relative to base 10 as compared to the configuration in FIG. 1. This inclined configuration is also shown in FIG. 12 which illustrates a cross-sectional view of support apparatus 100 taken along line 12-12 in FIG. 11. FIG. 14 is a top perspective view of support apparatus 100 shown in FIG. 12.

As described above, receiving member 18 is removably mounted to adjustable stand 14, 16 and is sized and shaped to securely receive a device, as described herein, to allow for improved manipulation of the device without use of a user's hand. As best shown in FIGS. 4, 6, 8, 9, 13 and 17, receiving member 18 is a receptacle of generally tubular construction with an open end configured to receive the object or device. Receiving member 18 is adjustably mounted to a free, terminal end of first tubular member 16 so as to permit the position of receiving member 18 to be adjusted at various preselected angular orientations relative to first tubular member 16 and, therefore, the stand, during use of support apparatus 100. A locking device (third locking device) 28 is mounted to receiving member 18 for removably securing receiving member 18 to first tubular member 16 at the preselected angular orientations.

According to the present invention as described herein, it will be appreciated that the cans for attachment between the various components of the support apparatus, including locking devices, enable a device to be removably secured to receiving member 18 in various positional (e.g., angular, rotational, linear) orientations relative to base 10 during use of support apparatus 100. The locking devices 24, 26 and 28 are configured for manual adjustment (e.g., without requiring any specialized tools) by a user to facilitate assembly of the support apparatus and use of the device to be mounted thereto.

The various components of support apparatus 100 can be made of suitable, rigid materials, including metals such as aluminum, steel and related alloys, and hard plastics suitable for the intended purpose without departing from the spirit and scope of the invention.

In a preferred embodiment, in the structural and positional configuration shown in FIGS. 1-2, the overall height of the support apparatus 100 from the support surface (e.g., floor) on which the support apparatus is placed to the top of receiving member 18 is in the range of about 30 inches to about 42 inches. This range for the overall height of support apparatus 100 is achieved, for example, by setting the height from the support surface (floor) to the top surface of ball joint member 12 to about 6 inches, the combined height of the first and second tubular members 16, 14 (maximum extended telescoping height), including locking device 26, to about 30 inches, and the height from the top of first tubular member 16 to the top of receiving member 18, including locking device 28, to about 6 inches. This includes, for example, setting the total height of first tubular member 16 to 12 inches and the total height of second tubular member 14 to 18 inches. It is understood and appreciated, however, that the overall dimensions for the apparatus (including overall height of support apparatus 100 in the structural and positional configuration shown in FIGS. 1-2) as well as the specific dimensions of the various components of support apparatus 100 can be varied from those mentioned above without departing from the spirit and scope of the invention.

Figure 19:
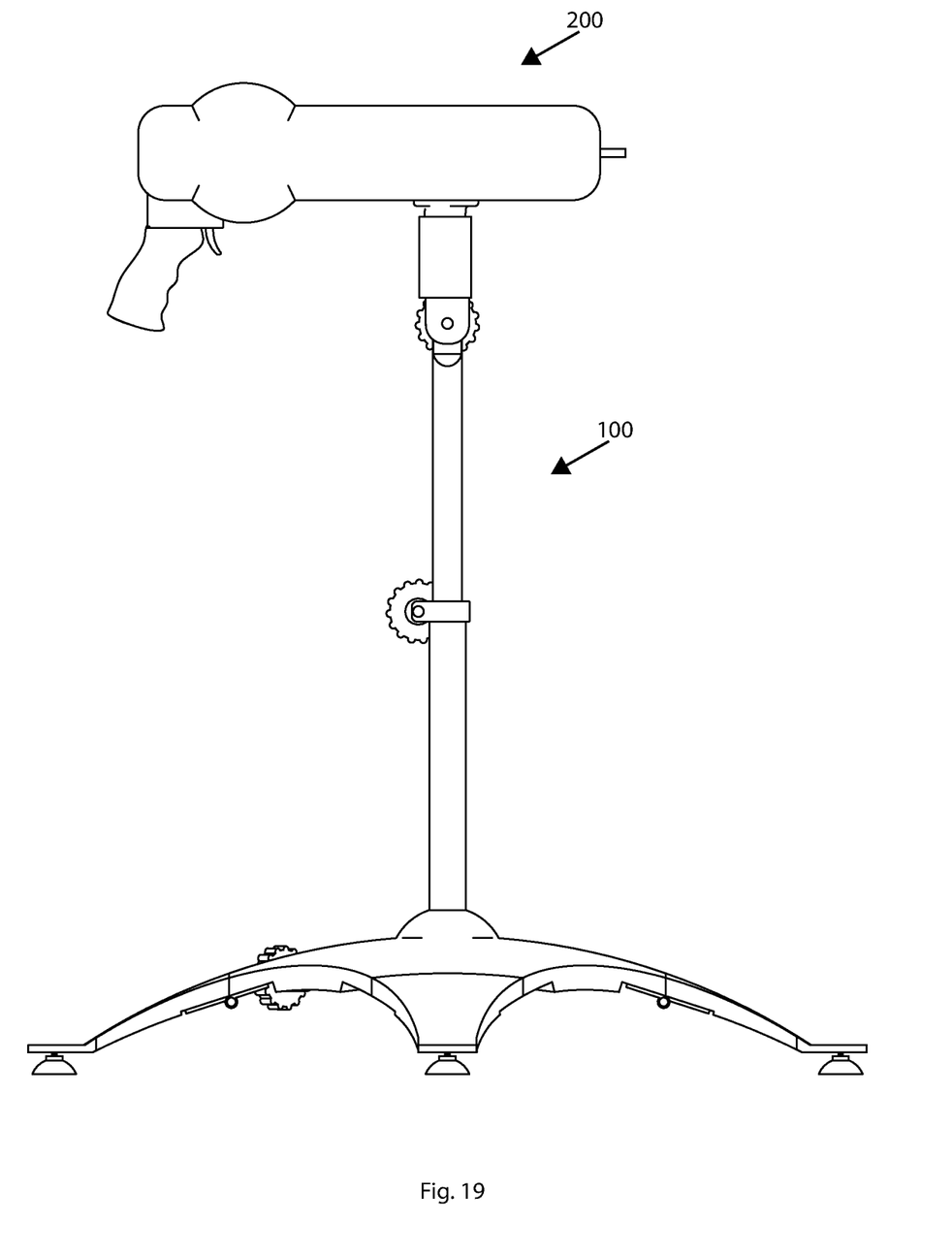
FIG. 19 is an elevational view showing the support apparatus according to the present invention in combination with an attached device, as another aspect of the present invention.

FIG. 19 is an elevational view showing support apparatus 100 according to the present invention in combination with an attached device, as another aspect of the present invention.

In the embodiment of FIG. 19, the support apparatus has the same construction as described above for support apparatus 100 with reference to FIGS. 1-18. The device in the combination is designated with reference numeral 200 and comprises any one or a combination of various suitable objects and/or devices configured to be removably securely mounted to receiving member 18 to position device 200, in conjunction with ball joint member 12 and adjustable stand 14, 16, at various positional orientations relative to base 10 so the user may enjoy hands free manipulation of device 200 during use of the combined support apparatus/device.

Various types of devices are contemplated for use in combination with support apparatus 100. For example, in one embodiment the device comprises an appliance, such as a hand-held hair dryer or similar device. In another embodiment, the device comprises a tool, such as a hand-held drill, reciprocating hammer or saw, and the like. In yet another embodiment, the device comprises a portable electronic device (e.g., mobile phone, personal digital assistant, smartphone, DVD, VCD, LCD or the like). In the exemplary embodiment shown in FIG. 19, device 200 comprises an adult sexual stimulation aid (e.g., sex toy).

According to the present invention, the means for mounting device 200 to support apparatus 100, as described above, permits quick and easy attachment to a variety of surfaces and in a variety of orientations, as well as being capable of accommodating a power cord (not shown) emanating from device. For example, the power cord can be passed through the tubular receiving member 18 and first and second tubular members 16, 14 of the adjustable stand so that the power cord does not interfere with use of the device while the device is retained in a snug, secure mounted relationship relative to support apparatus 100.

In operation, support apparatus 100 may be temporally attached by applying suction cups 22 to a flat surface, such as a tile or wood floor or a smooth wall. The user then inserts a base of the selected device as described above into receiving member 18. Once so inserted, the user passes the power cord of the device through the first and second tubular members 16, 14 and the device is secured to receiving member 18 using locking device 28 after receiving member 18 is adjusted (e.g., pivoted) to a preselected position (e.g., orientation) relative to the adjustable stand and base 10. Before or after adjustment of receiving member 18, first and second tubular members 16, 14 are adjusted to increase or decrease the length of the adjustable stand, as desired by the user, after which first and second tubular members 15, 14 are locked in place using locking device 26. Thereafter, before or after adjustment of receiving member and/or the adjustable stand as described above, ball joint member 12 is displaced (e.g., swiveled) relative to base 10 (i.e., by the user grasping and moving first tubular member 16 or second tubular member 14) to selectively position the adjustable stand in a preselected orientation relative to base 10. FIGS. 9-14 show examples of various preselected orientations of the adjustable stand relative base 10 as described above.

As described above, in a preferred embodiment device 200 is a sexual stimulation aid (sex toy) used in combination with support apparatus 100. For example, sex toy 200 may be selected from any known reciprocating stimulation device known in the sex toy industry, suitably adapted to be securely mounted to receiving member 18 of support apparatus 100 as described above. These types of sexual aids are designed to improve the sexual experience for one or more participants and are known in the art. Such aids vary widely in the sex toy industry. Some known devices of this type use a cam turned by a motor to act on a reciprocating piece. Other devices use a push rod mounted to a disc or wheel driven to push and pull the rod generally along the reciprocating direction. Another type of sexual stimulation device of this type uses linear movement along a screw, and reverses the motor to reverse directions. The support apparatus according to the present invention is suitable for use with reciprocating stimulation devices that offer improved stroke length, while allowing portability, battery power, and drive efficiency, and ability to drive various shapes and size of reciprocating stimulation bodies for use in various sex toys.

Several advantages are achieved by the support apparatus/sex toy combination according to the present invention described herein. When mounted on support apparatus 100 as described above, sex toy 200 can be used by a person for their own pleasure. For example, sex toy 200 can be used so that it provides relative (e.g., reciprocal) movement with respect to the point of mounting (e.g., receiving member 18) on support apparatus 100 so the user may enjoy hands free manipulation.

Another advantage is that while being mounted on support apparatus 100 as described herein, sex toy 200 can be used by one or more person in a way which facilitates varied and comfortable interaction with sex toy 200, and in particular which facilitates access to operating controls located on sex toy 200.

Another advantage is that support apparatus 100 provides a hands-free support apparatus which may be of particular use for persons suffering mobility problems who are unable to support themselves in the missionary position or unable to kneel or stand comfortably for a long enough period to pleasure their partner.

A further advantage is that the structural configuration and corresponding positional relation of the support apparatus/sex toy combination according to the present invention allows sex toy 200 to undergo reciprocal movement with the user which eliminates pain, resulting in a highly satisfying experience.

Another particularly important advantage of the support apparatus/sex toy combination according to the present invention is that it can be used by one person for providing pleasure to another person. This can be accomplished with the present invention without requiring any additional support arrangements.

In the support structure/sex toy combination according to the present invention, sex toy 200 may also be advantageously used by a person, when alone, for providing their own pleasure. This can be accomplished without the need for additional support arrangements, such as straps, in order to obtain hands free pleasure from sex toy 200. The support structure/sex toy combination also makes it easy to access operating controls on sex toy 200 while sex toy 200 is retained on support apparatus 100.

Various modifications may be made to the embodiments hereinbefore described without departing from the scope of the invention. For example, it will be appreciated that support apparatus 100, which is shown in the drawings as having a specific footprint, may have any suitable footprint. Additionally, support apparatus 100 may be of any suitable dimension for the environment in which it is to be used.

Although not shown in the drawings, support apparatus 100 may have strapping or fastening equipment (e.g., in addition to or in place of suction cups 22), which is used to secure support apparatus 100 to the chosen surface for use, the strapping or fastening equipment being separate to, or integral with, support apparatus 100. The fastening equipment may include, but not be limited to, straps, Velcro®, webbing, studs or clips. Alternatively, support apparatus 100 may be a "stand alone" product (as generally shown in FIGS. 1-19) which can be used without any additional strapping or securing. Furthermore, the various components of support apparatus 100 may have any suitable cross-sectional shape including, but not limited to, square, rectangular, triangular or oval. Similarly, base 10 may have any suitable three-dimensional shape including, but not limited to, a conical or tapering shape.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but are to be accorded the widest scope consistent with the principles and novel features disclosed herein.

What is claimed is:

1. A support apparatus comprising:
   a base member;
   a ball joint member movably mounted to the base member;
   an adjustable stand interconnected with the ball joint member; and
   a receiving member removably mounted to the adjustable stand for removably receiving and securely supporting an object or device;
   wherein the object or device comprises an adult sexual stimulation device in the form of a reciprocating stimulation device removably securely mounted to the receiving member of the support structure.

2. The support apparatus of claim 1, further comprising a first locking device for securing the hall joint member in a preselected position relative the base.

3. The support apparatus of claim 1, wherein the base has leg portions operable to support the base member on a surface.

4. The support apparatus of claim 3, wherein the leg portions are mounted to the base member via hinges allowing the support leg portions to be pivoted relative to the base between an unfolded state, in which the leg potions support the base member on the surface during use of the support apparatus, and a folded state, in which the leg portions are folded relative to the base during non-use of the support apparatus to facilitate storage of the support apparatus.

5. The support apparatus of claim 1, further comprising securing means disposed at the terminal end of each leg portion for removably and securely mounting the base to a variety of surfaces during use of the support apparatus.

6. The support apparatus of claim 5, wherein the securing means comprises a suction cup.

7. The support apparatus of claim 1, wherein the adjustable stand comprises rod-like tubular members or conduits including a first tubular member supporting the receiving member and a second tubular member into which the first tubular member is inserted.

8. The support apparatus of claim 7, wherein the first and second tubular members form a telescoping stand permitting the extent to which first tubular member extends into and out of second tubular member to be varied so as to permit quick and easy adjustment of the length of the stand during use of the support apparatus.

9. The support apparatus of claim 7, further comprising a first locking device for securing the ball joint member in a preselected position relative the base; and a second locking device mounted to the stand to removably secure the first tubular member relative to the second tubular member to achieve a desired, preselected length for the adjustable stand.

10. The support apparatus of claim 7, wherein the receiving member is adjustably mounted to a free, terminal end of the first tubular member so as to permit the position of the receiving member to be adjusted at various preselected angular orientations relative to the first tubular member.

11. The support apparatus of claim 7, further comprising a first locking device for securing the ball joint member in a preselected position relative the base; a second locking device mounted to the stand to removably secure the first tubular member relative to the second tubular member to achieve a desired, preselected length for the adjustable stand; and a third locking device mounted to the receiving member for removably securing the receiving member to the first tubular member at the preselected angular orientations.

12. The support apparatus of claim 1, wherein a cup-like recess is formed in a generally central portion of the base member for receiving and securely retaining the ball joint member, whereby the ball joint member is configured to undergo rotational movement in the recess to place adjustable stand at various angles relative to the base.

13. The support apparatus of claim 1, wherein the receiving member is removably mounted to the adjustable stand and is sized and shaped to securely receive the sexual stimulation device to allow for improved, manipulation of the sexual stimulation device without use of a user's hand.

14. The support apparatus of claim 1, wherein the receiving member comprises a receptacle of generally tubular construction with an open end configured to receive the sexual stimulation device.

15. The support apparatus of claim 1, further comprising: a first locking device for securing the ball joint member in a preselected position relative the base; a second locking device mounted to the stand to removably secure the first tubular member relative to the second tubular member to achieve a desired, preselected length for the adjustable stand; and a third locking device mounted to the receiving member for removably securing the receiving member to the first tubular member at the preselected angular orientations; wherein the first, second and third locking devices are configured for manual adjustment without requiring use of any specialized tools by a user to facilitate assembly of the support apparatus and use of the adult sexual stimulation device to be mounted thereto.

16. The support apparatus of claim 1, wherein the adjustable stand comprises rod-like tubular members or conduits including a first tubular member supporting the receiving member and a second tubular member into which the first tubular member is inserted; and further comprising: a first locking device for securing the ball joint member in a preselected position relative the base member; a second locking device mounted to the adjustable stand to removably secure the first tubular member relative to the second tubular member to achieve a desired, preselected length for the adjustable stand; and a third locking device mounted to the receiving member for removably securing the receiving member to the first tubular member at the preselected angular orientations; wherein the first, second and third locking devices are configured for manual adjustment without requiring use of any specialized tools by a user to facilitate assembly of the support apparatus and use of the adult sexual stimulation device mounted thereto.

\* \* \* \* \*